United States Patent
Wu et al.

(10) Patent No.: US 6,728,462 B2
(45) Date of Patent: Apr. 27, 2004

(54) OPTICAL FIBER CABLE HOLDER

(75) Inventors: Kun-Tsan Wu, Tu-Chen (TW); Chun Yu Lee, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 27 days.

(21) Appl. No.: 10/026,484

(22) Filed: Dec. 24, 2001

(65) Prior Publication Data
US 2003/0095775 A1 May 22, 2003

(30) Foreign Application Priority Data
Nov. 7, 2001 (TW) ...................................... 90219109 U

(51) Int. Cl.[7] ................................................ G02B 6/00
(52) U.S. Cl. ........................ 385/137; 385/134; 385/136
(58) Field of Search ................................ 385/134, 135, 385/136, 137

(56) References Cited

U.S. PATENT DOCUMENTS

| | | | | |
|---|---|---|---|---|
| 4,986,625 A | * | 1/1991 | Yamada et al. ............... | 385/55 |
| 6,259,851 B1 | * | 7/2001 | Daoud ......................... | 385/135 |
| 6,278,830 B1 | * | 8/2001 | Levesque et al. ............ | 385/136 |
| 6,298,191 B1 | * | 10/2001 | Daoud ......................... | 385/137 |
| 6,324,331 B1 | * | 11/2001 | DeMeritt et al. ............ | 385/134 |
| 6,456,772 B1 | * | 9/2002 | Daoud ......................... | 385/135 |
| 6,535,683 B1 | * | 3/2003 | Johnson et al. ............. | 385/136 |
| 2002/0131750 A1 | * | 9/2002 | Holman et al. .............. | 385/136 |
| 2003/0039460 A1 | * | 2/2003 | Muller et al. ................ | 385/135 |

* cited by examiner

*Primary Examiner*—Robert H. Kim
*Assistant Examiner*—Michael H Caley
(74) *Attorney, Agent, or Firm*—Wei Te Chung

(57) ABSTRACT

An optical fiber cable holder (1) includes a clasping portion (11) and a fixing portion (12). The clasping portion includes a top cover (1), and two side walls (112) depending from opposite sides of the top cover. A pair of bent arms (114) respectively extends from other opposite sides of the top cover, to prevent excessive bending of any cable (3) secured in the holder. A pair of spring arms (113) slants inwardly from the side walls, to retain the cables in the clasping portion. The fixing portion includes a pair of locking legs (121) and four stop latches (122). The locking legs are engagingly received through a pair of holes (21) defined in a base plate (2). The stop latches are supported on the base plate. The holder is thereby fixed on the base plate.

3 Claims, 2 Drawing Sheets

OPTICAL FIBER CABLE HOLDER

BACKGROUND OF THE INVENTION

1. Field of the Invention

The present invention relates to optical fiber cable holders, and more particularly to an optical fiber cable holder that restricts the degree to which optical fiber cables can be bent.

2. Description of the Related Art

In optical transmission networks, communication is performed by light transmitting devices connected to one another by optical fiber cables. Cable holders retain the cables in position between the light transmitting devices. Each cable generally comprises a core bundle of optical fibers made of frangible quartz glass, and an outer cladding protecting the core. When the position of a light transmitting device in a network is changed, the cables can readily bend. However, excessive bending can result in leakage of light from the optical fibers, and even breakage of the optical fibers.

Conventional cable holders are most often used for electrical cables. U.S. Pat. No. 5,149,027 discloses a snap fit cable holder having a U-shaped configuration. Two legs each have snap fit projections on both insides and outsides thereof, the projections being at different heights relative to a support base. Cables are positioned in a space between the holder and the support base. The holder can accommodate varying amounts and varying sizes of cables. However, the holder does not prevent excessive bending of cables.

U.S. Pat. No. 5,530,785 discloses an optical fiber cable fixing structure. The fixing structure comprises an arcuate inner peripheral surface for contacting a first cable holding member secured to a fixed member, and an arcuate inner peripheral surface for contacting a side surface of an optical fiber cable. A second cable holding member is mounted on the fixed member, for sliding toward and away from the first cable holding member. The second cable holding member has an arcuate second inner peripheral surface for contacting a side surface of the cable, and stopper means adapted to removably fix the second cable holding member in any desired position. However, the fixing structure does not prevent excessive bending of cables.

In view of the above, there is a need for an improved holder which can effectively prevent excessive bending of optical fiber cables.

SUMMARY OF THE INVENTION

Therefore, an object of the present invention is to provide an optical fiber cable holder which prevents excessive bending of cables.

To achieve the above-mentioned object, an optical fiber cable holder in accordance with the present invention comprises a clasping portion and a fixing portion. The clasping portion includes a top cover, and two side walls depending from opposite sides of the top cover. A pair of bent arms respectively extends from other opposite sides of the top cover, to prevent excessive bending of any cable secured in the holder. A pair of spring arms slants inwardly from the side walls, to retain the cables in the clasping portion. The fixing portion includes a pair of locking legs and four stop latches. The locking legs are engagingly received through a pair of holes defined in a base plate. The stop latches are supported on the base plate. The holder is thereby fixed on the base plate.

Other objects, advantages and novel features of the invention will become more apparent from the following detailed description when taken in conjunction with the accompany drawings, in which:

DETAILED DESCRIPTION OF THE INVENTION

Figure 1:
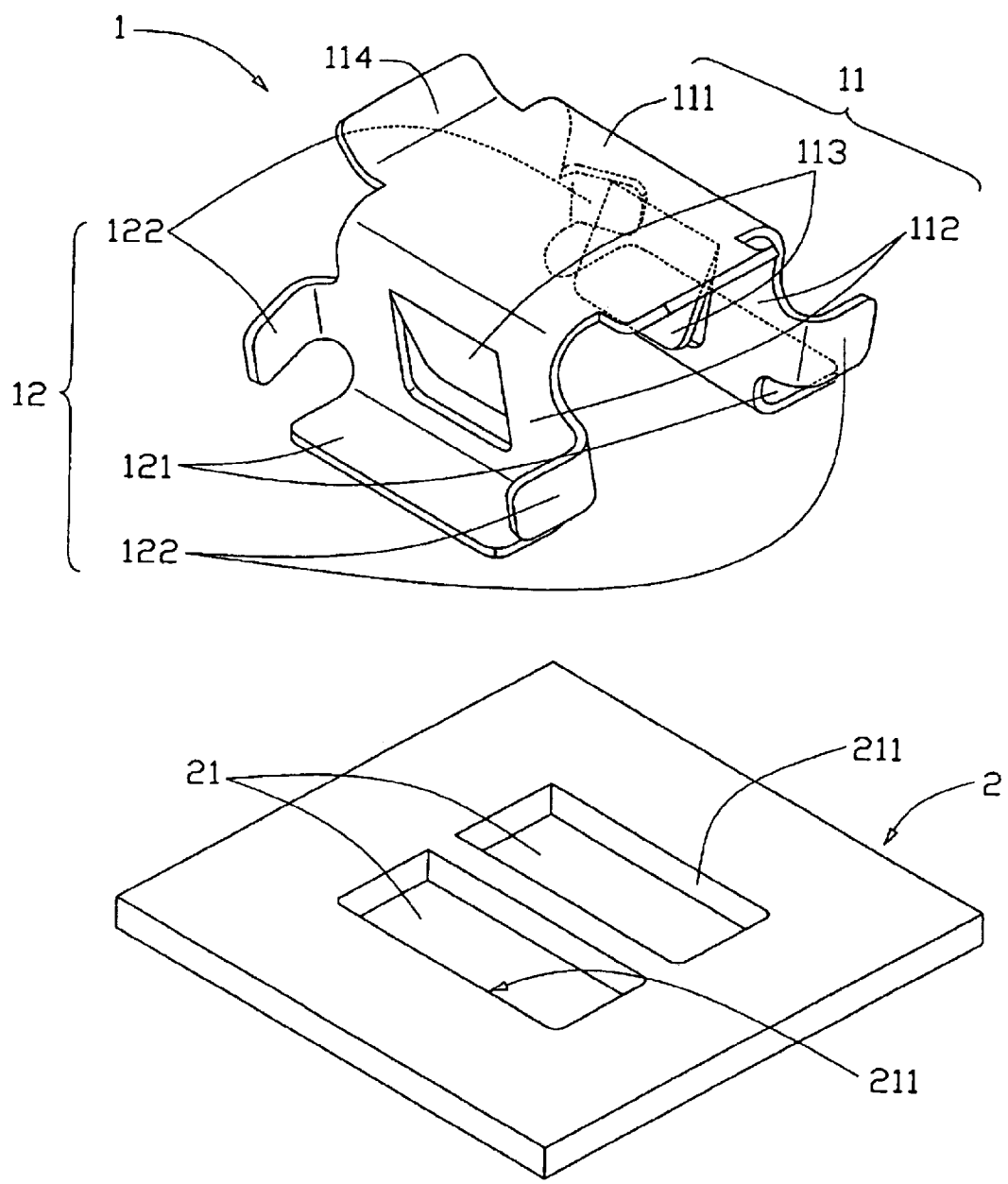
FIG. 1 is an exploded perspective view of an optical fiber cable holder in accordance with the present invention, together with a base plate.

Referring to FIG. 1, an optical fiber cable holder 1 in accordance with a preferred embodiment of the present invention is integrally made from a single piece of metal or a single piece of injection molded plastic material. The holder 1 is fixed on a base plate 2.

The holder 1 includes a U-shaped clasping portion 11 for holding fibers 3 (see FIG. 2), and a fixing portion 12. The clasping portion 11 comprises a top cover 111, a pair of side walls 112 respectively depending from opposite sides of the top cover 111, and a pair of elastically deformable spring arms 113 respectively slanting inwardly from the side walls 112. A pair of bent arms 114 (only one labeled in FIG. 1) respectively extends outwardly and upwardly from opposite sides of the top cover 111, said opposite sides transversely connecting the side walls 112. The bent arms 114 restrict the degree to which the fibers 3 can be bent. The fixing portion 12 includes a pair of locking legs 121 extending perpendicularly outwardly from the side walls 112 respectively, and a pair of stop latches 122 extending perpendicularly outwardly from respective opposite edges of each side wall 112.

The base plate 2 is square, and has two rectangular holes 21, with a crossbar therebetween, defined in a middle portion thereof. Each hole 21 is respectively bounded by an internal edge 211 of the base plate 2, the internal edge 211 corresponding to one of the side walls 112 of the holder 1. A distance spanned by the two holes 21 between the respective internal edges 211 corresponds to and is substantially equal to a distance between the two side walls 112. A size of each hole 21 is greater than a size of each locking leg 121 of the holder 1.

Figure 2:
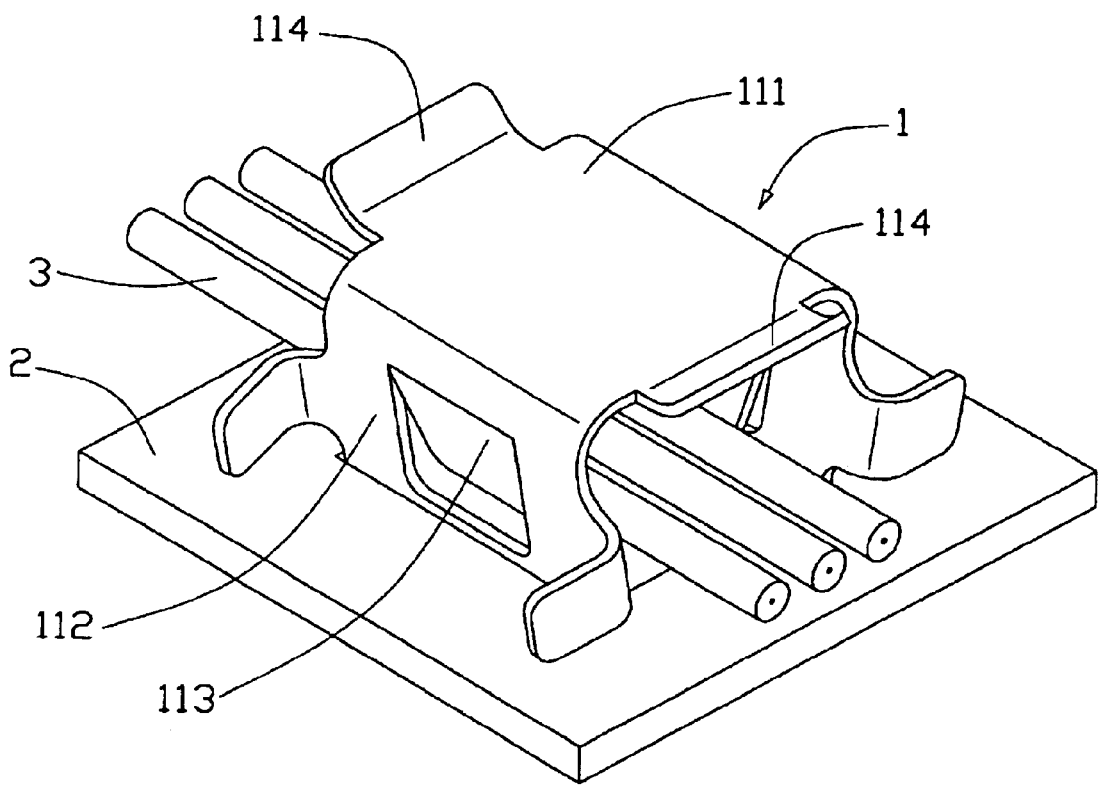
FIG. 2 is an assembled view of FIG. 1, and showing optical fiber cables held in the optical fiber cable holder.

Referring also to FIG. 2, in use, the fibers 3 are inserted into the clasping portion 11 of the holder 1. The side walls 112 of the holder 1 are squeezed toward each other, and the locking legs 121 of the holder 1 are passed through the holes 21 of the base plate 2. The side walls 112 are released, and resiliently return part of the way back to their original orientations to abut against the internal edges 211 of the holes 21. The stop latches 122 are supported on the base plate 2, and the holder 1 is thereby firmly secured to the base plate 2.

In removing the holder 1 from the base plate 2, the side walls 112 of the holder 1 are squeezed toward each other. The locking legs 121 of the holder 1 are then withdrawn from the holes 21 of the base plate 2.

The holder 1 holds the fibers 3 in the clasping portion 11. The spring arms 113 slants inwardly to retain the fibers 3 in the clasping portion 11. Because the spring arms 113 are elastically deformable, the holder 1 can hold varying amounts and varying sizes of fibers 3. The bent arms 114 restrict the degree to which the fibers 3 can be bent.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical fiber cable holder fixed on a base plate, the optical fiber cable holder comprising:

a clasping portion to hold cables, the clasping portion comprising a top cover and two side walls depending from opposite sides thereof; and a fixing portion fixing the optical fiber cable holder on the base plate; wherein at least one bent arm extends from at least a side of the top cover other than the sides from which the side walls depend to prevent excessive bending of the cables; wherein the at least one bent arm extends upwardly from the at least a side of the top cover;

wherein the clasping portion further includes at least one spring arm extending from at least one of the side walls to hold the cables in the clasping portion; wherein the at least one spring arm slants inwardly from the at least one of the sidewalls.

2. An optical fiber cable holder fixed on a base plate, the optical fiber cable holder comprising:

a clasping portion to hold fibers, the clasping portion having a top cover and two side walls depending downwardly from two opposite sides thereof;

a fixing portion connecting with the side walls of the clasping portion and fixing the optical fiber cable holder to the base plate; and at least one bent arm extending from the top cover of the clasping portion to prevent excessive bending of the fibers; wherein the clasping portion includes at least one spring arm extending inwardly from at least one of the side walls to hold the fibers in the clasping portion; wherein the at least one spring arm slants inwardly from the at least one of the side walls.

3. An optical fiber cable assembly comprising:

a base plate defining two spaced holes; and a one-piece holder mounted on said base plate, said holder including:

a U-shaped clasping portion including a top cover with a pair of side walls extending downwardly by two sides thereof, said top cover together with said pair of side walls defining a receiving space above said base plate;

a lower locking leg and an upper stop latch discretely formed on and spaced from each other along each of said side walls and commonly defining therebetween a gap to receive said base plate therein; wherein a planar dimension of said locking leg is not substantially larger than a dimension of the corresponding hole through which said locking leg extends; wherein both the lower locking leg and the upper stop latch are vertically positioned outside of the base plate and horizontally exposed to an exterior.

* * * * *